UNITED STATES PATENT OFFICE.

ANTONIO PELLETIER, OF WASHINGTON, DISTRICT OF COLUMBIA.

IMPROVEMENT IN CONCRETE PAVEMENTS.

Specification forming part of Letters Patent No. 177,744, dated May 23, 1876; application filed November 6, 1875.

*To all whom it may concern:*

Be it known that I, ANTONIO PELLETIER, of Washington, in the county of Washington and District of Columbia, have invented certain new and useful Improvements in Street-Pavements; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The ground being properly prepared and leveled, I place thereon a layer of broken stone or coarse gravel of the thickness required, having reference to the character of the soil and the use to be made of the pavement. Then I prepare a grout, composed of hydraulic lime of tiel, terra alba, fluor-spar, or any similar hydraulic cement, mixed with oxide of iron and a dry chloride, either of calcium or of iron, in about the following proportions, to wit: one part of the oxide of iron to twelve parts of the composition of the bed of the pavement, including the stone or gravel, and one ounce of the chloride to one square yard of the pavement, calculated at one foot in thickness, which grout is made of such a consistency as freely to fill up the interstices of the stone or gravel; or, if preferable, the stone or gravel may be first mixed with the grout, and laid down of the thickness required.

The effect of the chloride used in connection with the oxides contained in the lime and iron is to produce a chlorine which, after evaporation, leaves an oxychloride and converts the whole mass into a solid bed or foundation.

This chlorine is also a great promoter of health, by uniting with and purifying the noxious gases arising from the earth.

Upon this foundation so prepared, after the lapse of sufficient time to harden, say twelve hours, I place a coating or superstructure of one or two or more inches in thickness, prepared as follows, to wit: take fifteen parts of asphalt or bitumen, fifty parts of carbonate of lime, three parts of oxide of iron, and two hundred parts of clean sharp sand, (or in about those proportions;) thoroughly mix the same, the asphalt or bitumen being melted, and to be mixed while hot; then add one part of chloride of lime, and spread this mixture evenly over the surface, and roll with a hand or steam roller, with projections on the face of the roller to produce indentations in the pavement to prevent the slipping of horses.

Having thus described my invention, what I claim is—

1. The combination of broken stone or gravel with hydraulic lime of tiel, terra alba, fluor-spar, or other similar hydraulic lime, oxide of iron, and chloride, for the foundation of a pavement, substantially as set forth.

2. The combination of the asphalt or bitumen, carbonate of lime, oxide of iron, sand, and chloride of calcium, for the coating of a pavement, substantially as set forth.

3. The combination, in a carriage-pavement, of a foundation and coating constructed of the materials, and substantially in the manner, as set forth.

In testimony that I claim the foregoing as my own I affix my signature in the presence of two witnesses.

ANTONIO PELLETIER.

Witnesses:
 A. L. MERRIMAN,
 W. T. JOHNSON.